(12) United States Patent
Jang (10) Patent No.: US 9,835,061 B2
(45) Date of Patent: Dec. 5, 2017

(54) CYLINDER BLOCK HAVING DIFFERENT AMOUNT OF OIL SUPPLY FOR EACH JOURNAL

(71) Applicant: HYUNDAI MOTOR COMPANY, Seoul (KR)

(72) Inventor: Pil-Sung Jang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 125 days.

(21) Appl. No.: 14/939,821

(22) Filed: Nov. 12, 2015

(65) Prior Publication Data

US 2016/0153396 A1 Jun. 2, 2016

(30) Foreign Application Priority Data

Dec. 2, 2014 (KR) .................. 10-2014-0170573

(51) Int. Cl.
| | |
|---|---|
| *F01M 1/02* | (2006.01) |
| *F16C 17/10* | (2006.01) |
| *F01M 11/02* | (2006.01) |
| *F02F 7/00* | (2006.01) |
| *F16C 33/10* | (2006.01) |
| *F16C 9/02* | (2006.01) |
| *F01M 1/06* | (2006.01) |

(52) U.S. Cl.
CPC ............ *F01M 11/02* (2013.01); *F02F 7/007* (2013.01); *F02F 7/0053* (2013.01); *F01M 2001/062* (2013.01); *F01M 2011/026* (2013.01); *F16C 9/02* (2013.01); *F16C 33/106* (2013.01)

(58) Field of Classification Search
CPC ........ F02F 7/007; F02F 7/0002; F02F 7/0053; F01M 2001/062; F01M 2011/026; F01M 11/02; F16C 9/02; F16C 33/106; F16C 33/1065; F16C 33/1085; F16C 33/6681
USPC ................. 123/196 R, 198 DA; 384/288
See application file for complete search history.

(56) References Cited

U.S. PATENT DOCUMENTS

| | | | |
|---|---|---|---|
| 8,151,758 B2 * | 4/2012 | Ni | .............. F16C 3/14 |
| | | | 123/196 R |
| 8,376,620 B2 | 2/2013 | Yamazaki et al. | |
| (Continued) | | | |

FOREIGN PATENT DOCUMENTS

| | | |
|---|---|---|
| JP | 2011-208691 A | 10/2011 |
| JP | 2014-047846 A | 3/2014 |
| KR | 2014-0018631 A | 2/2014 |

*Primary Examiner* — Syed O Hasan
(74) *Attorney, Agent, or Firm* — McDermott Will & Emery LLP (57) ABSTRACT

A cylinder block has a different amount of oil supply for each journal, in which a plurality of bearing saddles are arranged at intervals and main bearings, which support main journals of a crank shaft, are respectively mounted to the plurality of bearing saddles. The bearing saddles comprise oil galleries formed in the cylinder block. Oil chambers are recessed from surfaces of the plurality of bearing saddles, to which an oil is supplied through the oil galleries, and communicate with end portions of the oil galleries to store the oil supplied from the oil galleries. The main bearings have oil holes through which the oil introduced into the oil chambers flow to the main journals. The amount of oil supplied to the main journals is determined according to an overlapped amount between the oil chambers and the oil holes.

5 Claims, 13 Drawing Sheets

(56) References Cited

U.S. PATENT DOCUMENTS

| | | | |
|---|---|---|---|
| 9,062,714 B2 * | 6/2015 | Kato | F16C 33/1055 |
| 2010/0046869 A1 * | 2/2010 | Matsuyama | F16C 9/02 |
| | | | 384/288 |
| 2012/0294558 A1 | 11/2012 | Ovares et al. | |

* cited by examiner

CYLINDER BLOCK HAVING DIFFERENT AMOUNT OF OIL SUPPLY FOR EACH JOURNAL

CROSS-REFERENCE(S) TO RELATED APPLICATIONS

This application claims benefit of priority to Korean Patent Application No. 10-2014-0170573, filed on Dec. 2, 2014, which is incorporated herein by reference in its entirety.

TECHNICAL FIELD

The present disclosure relates to a cylinder block constituting a vehicle engine, and more particularly, to a cylinder block having a different amount of oil supply for each journal, capable of reducing unnecessary supply of oil.

BACKGROUND

A vehicle engine converts explosive power, which is generated by each cylinder, into rotary motion, and outputs the rotary motion through a crank shaft installed to the engine.

Figure 1:
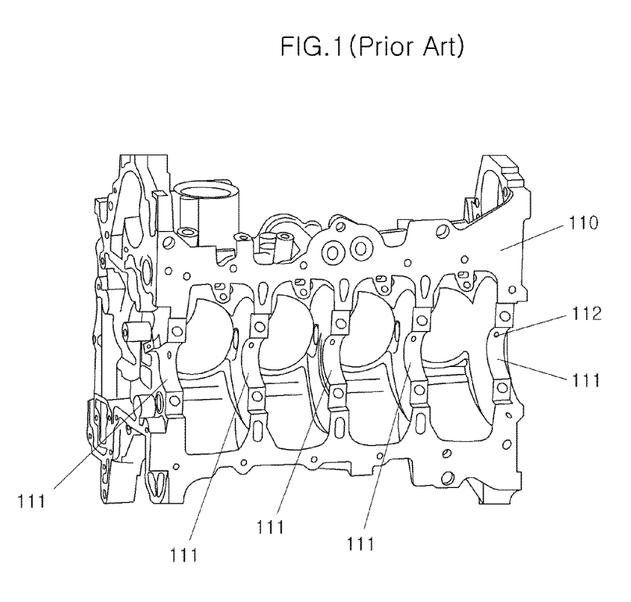
FIG. 1 is a bottom view illustrating a portion of a cylinder block according to the related art.
Figure 2:
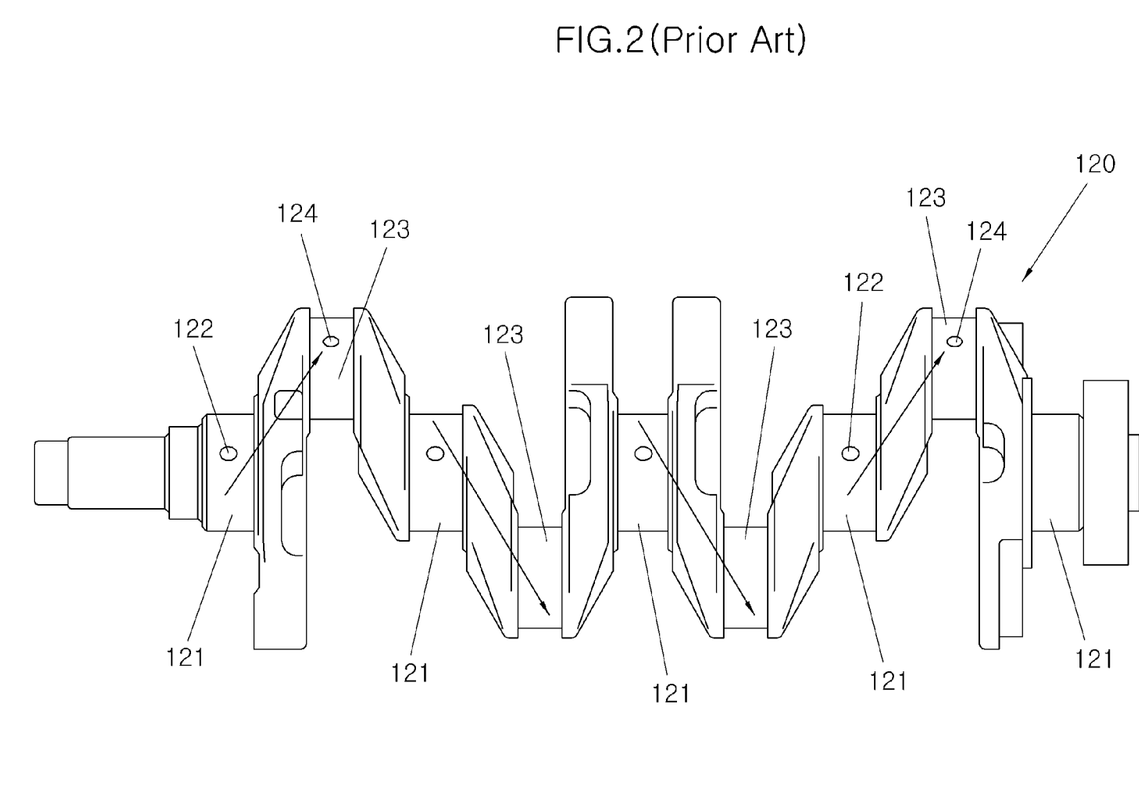
FIG. 2 is a top view illustrating an oil supply structure in a crank shaft according to an example of the related art.
Figure 3:
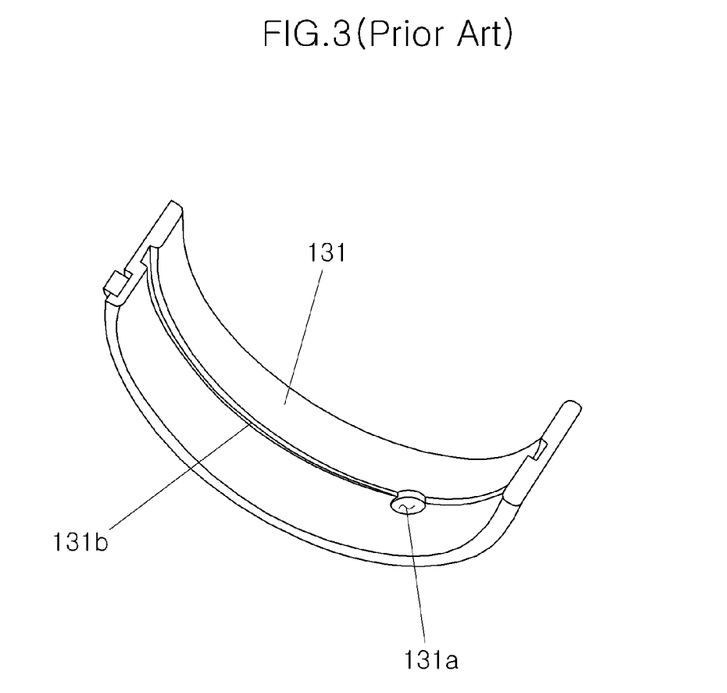
FIG. 3 is a perspective view illustrating a main bearing applied to each main journal of the crank shaft in FIG. 2.

FIG. 1 illustrates a bottom view of a cylinder block 110 having a crank shaft 120. The cylinder block 110 has a bearing saddle 111 formed at each portion thereof to which the crank shaft 120 in FIG. 2 is seated. A main bearing 131 is mounted to the bearing saddle 111 and reduces friction between the cylinder block 110 and the crank shaft 120. That is, the main bearing 131 illustrated in FIG. 3 is seated to each bearing saddle 111, and each main journal 121 of the crank shaft 120 is seated to the main bearing 131, so that the crank shaft 120 is assembled to the cylinder block 110.

Oil passages for supplying oil to reduce friction generated during the operation of the engine are respectively formed in the cylinder block 110 and the crank shaft 120. The main journals 121, at which the crank shaft 120 comes into contact with the cylinder block 110, or pin journals 123, by which the crank shaft 120 is connected to a connecting rod, are lubricated through the oil passages.

That is, the bearing saddle 111 of the cylinder block 110 has an oil gallery 112 for the oil supply as illustrated in FIG. 1. In addition, the main bearing 131 has an oil hole 131a through which the oil passes, and a groove 131b through which the oil is evenly supplied around the associated main journal 121. Each of main journals 121 and each of pin journals 123 respectively have oil holes 122 and 124, which communicate with each other. The oil in the main journal 121 is introduced into the oil hole 122 of the main journal 121, and is then discharged from the oil hole 124 of the pin journal 123 adjacent thereto to lubricate the pin journal 123.

The oil is supplied from each main journal 121 to the pin journal 123 adjacent thereto, as illustrated in FIG. 2. For this reason, an oil leak occurs in the associated main journal 121, thereby increasing capacity of an oil pump and deteriorating fuel efficiency.

Figure 4:
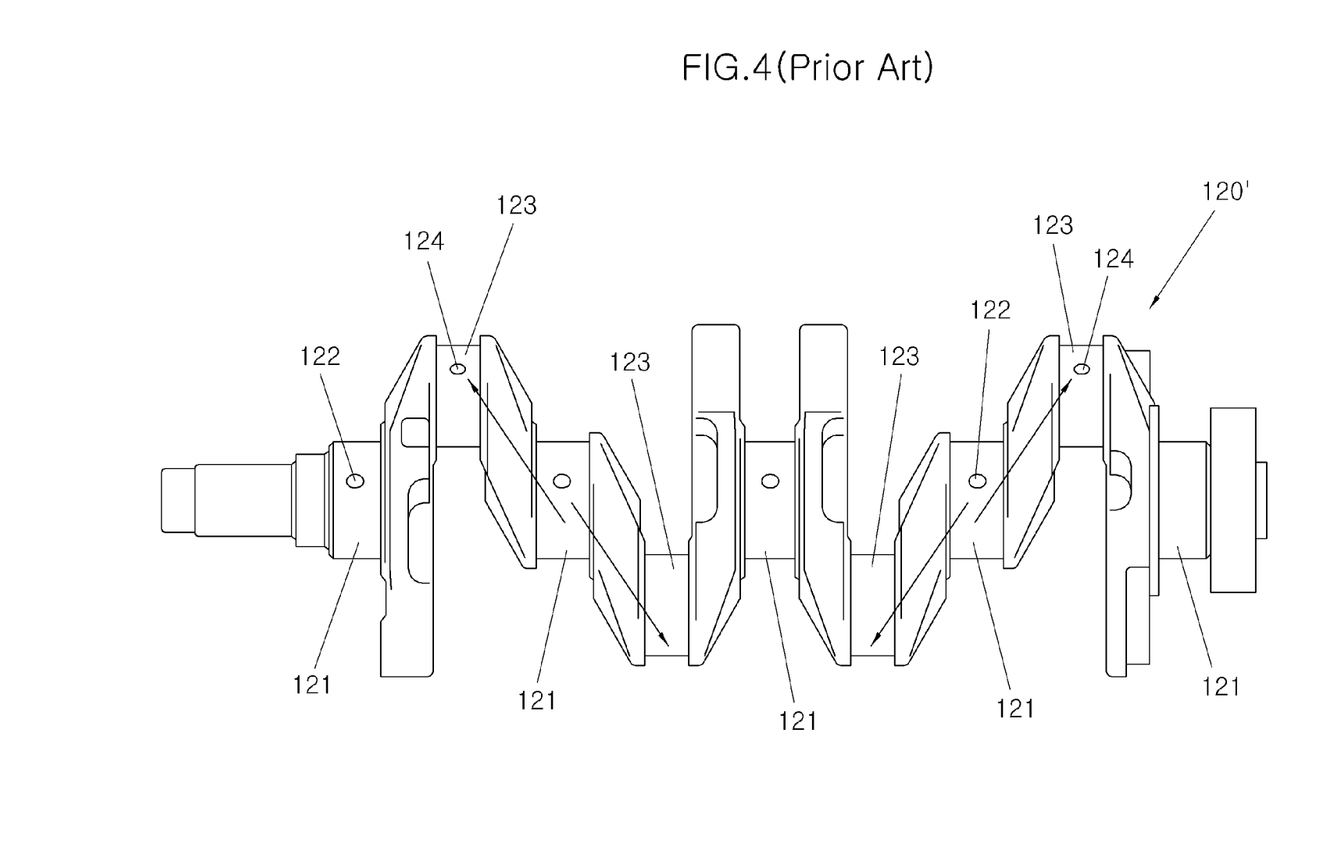
FIG. 4 is a top view illustrating an oil supply structure in a crank shaft according to another example of the related art.

In order to resolve this problem, a method in which oil is supplied from one main journal 121 to opposite pin journals 123 adjacent thereto in a crank shaft 120' as illustrated in FIG. 4 has been proposed. As a result, an oil leakage is reduced compared to a structure in which the oil is supplied from each main journal 121 to one pin journal 123 adjacent thereto, and thus, an oil pump may have a decreased capacity.

Figure 5:
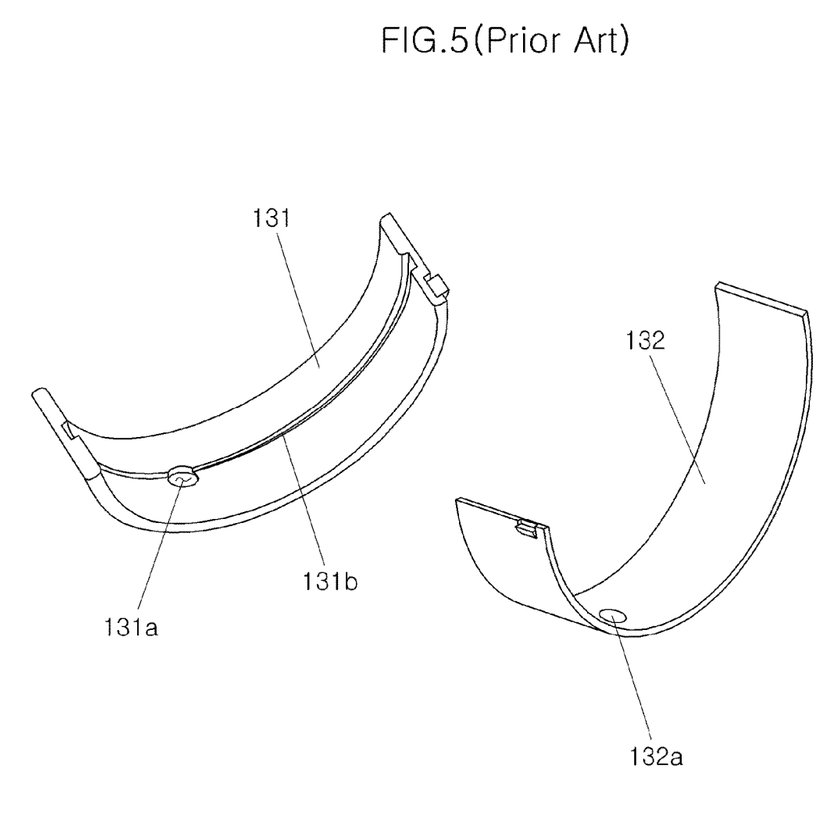
FIG. 5 is a perspective view illustrating different main bearings applied to main journals of the crank shaft in FIG. 4.

However, different types of main bearings have to be fitted to the main journals 121, as illustrated in FIG. 5. That is, the main bearing 131 fitted to the main journal 121, which supplies oil to the adjacent pin journal 123, has the oil hole 131a and the groove 131b, whereas a main bearing 132 fitted to the main journal 121, which does not supply oil to the adjacent pin journal 123, has only a small oil hole 132a without having a groove.

In addition, various techniques are applied to the main bearings fitted to the main journals 121 in order to decrease the oil leak for reduction in friction and improvement in fuel efficiency.

Figure 6:
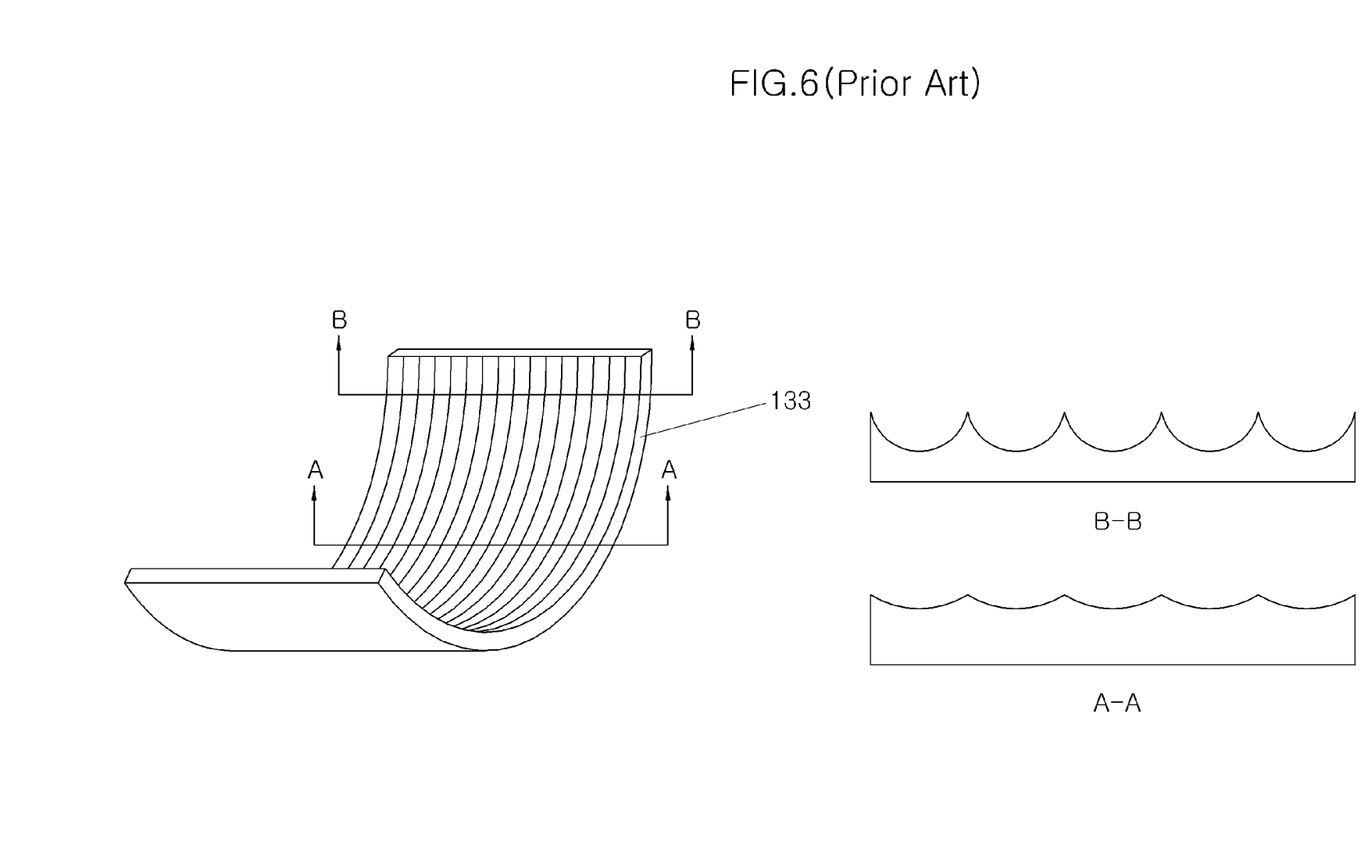
FIG. 6 is a perspective view illustrating an example of a main bearing for reducing an oil leak between a cylinder block and a crank shaft according to the related art.

As an example, grooves are circumferentially formed on an inner surface of a main bearing 133, and the grooves have different lengths according to the main bearing 133, as illustrated in FIG. 6. Consequently, the amount of oil leak may decrease.

Figure 7:
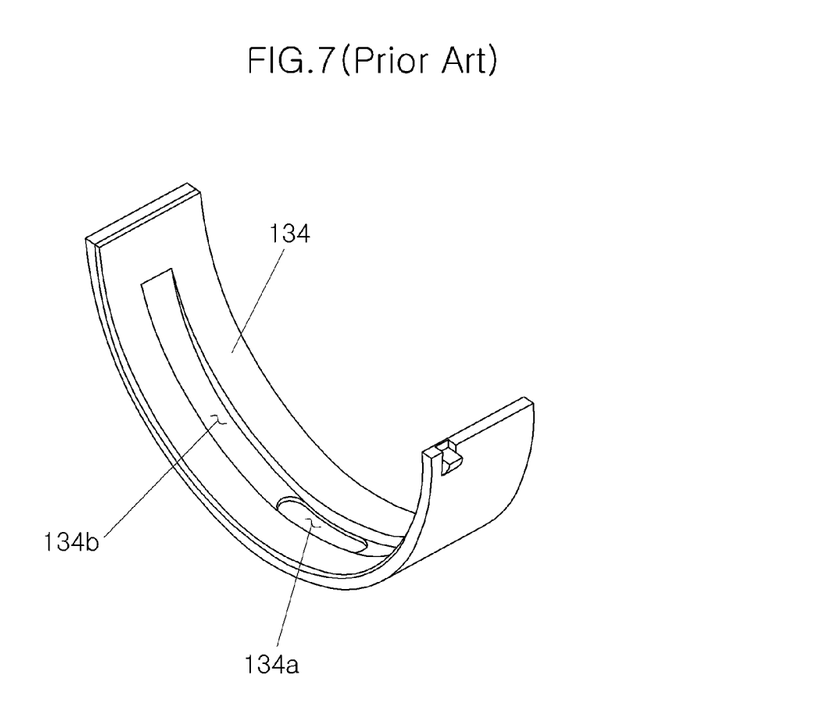
FIG. 7 is a perspective view illustrating another example of a main bearing for reducing an oil leak between a cylinder block and a crank shaft according to the related art.

In addition, referring to FIG. 7, a groove 134b is formed at the center portion on the inner surface of a main bearing 134 according to another example in the related art, instead of being formed at both ends of the main bearing 134. The groove 134b has a deeper depth as approaching the center portion in order to reduce a leak of oil supplied to an oil hole 134a.

However, when each bearing is different as described above, it is difficult to produce the cylinder block in large quantities due to the increased specifications of the bearings. In addition, since the bearings having different specifications are assembled to the different portions of the cylinder block, the engine may be damaged due to abrasion of a friction portion according to an insufficient supply of oil when the bearings are erroneously assembled.

SUMMARY

An aspect of the present inventive concept is directed to a cylinder block having a different amount of oil supply for each journal, capable of allowing oil chambers, which have spaces for temporarily storing oil in bearing saddles, to have different lengths.

Another aspect of the present inventive concept is directed to a cylinder block having a different amount of oil supply for each journal, in which an overlapped amount of oil chambers and oil holes of the same main bearings varies when the main bearings are assembled to bearing saddles.

Other objects and advantages of the present inventive concept can be understood by the following description, and become apparent with reference to the embodiments of the present inventive concept. It is obvious to those skilled in the art to which the present disclosure pertains that the objects and advantages of the present inventive concept can be realized by the means as claimed and combinations thereof.

In accordance with an embodiment of the present inventive concept, a cylinder block having a different oil supply for each journal, in which a plurality of bearing saddles are arranged at intervals and main bearings, which support main journals of a crank shaft, are respectively mounted to the plurality of bearing saddles. The bearing saddles have oil galleries, which are formed in the cylinder block, and oil chambers are recessed from surfaces of the bearing saddles. Oil is supplied to the surfaces of the bearing saddles through the oil galleries. The oil chambers communicate with ends of the oil galleries to store the oil supplied from the oil galleries. The main bearings mounted to the bearing saddles have oil holes through which the oil introduced into the oil chambers flow to the main journals of the crank shaft. The amount of oil supplied to the main journals of the crank shaft is determined according to an overlapped amount between the oil chambers and the oil holes.

The amount of oil supply may increase in proportion to the overlapping amount between the oil chambers and the oil holes.

The oil holes formed in the main bearings may have the same position, and the oil chambers may differently overlap with the oil holes according to lengths of the oil chambers in the bearing saddles.

The oil chambers may overlap with the oil holes in two different sizes in an alternate manner from one side of the cylinder block.

The cylinder block may be applied to a four-cylinder internal combustion engine. The oil chambers formed in second and fourth bearing saddles from the one side of the cylinder block may have a longer length than those formed in first, third, and fifth bearing saddles.

The oil holes formed in the main bearings may have the same position, and the oil chambers may differently overlap with the oil holes according to the positions of the oil chambers formed in the bearing saddles.

The main bearings, which are assembled to the respective bearing saddles, may have the same shape.

Each of the oil holes formed in the main bearings may have a slot shape in a circumferential direction of the main bearings.

DETAILED DESCRIPTION

A cylinder block having a different oil supply for each journal according to exemplary embodiments of the present inventive concept will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present inventive concept.

In a cylinder block having a different oil supply amount for each journal according to the embodiment of the present inventive concept, bearing saddles 11 of a cylinder block 10, to which a crank shaft is mounted, are formed with oil galleries 12 for supplying oil to the bearing saddles 11. Oil chambers 13 temporarily store the oil and have a different length. In order to lubricate main journals or pin journals of the crank shaft according to the overlapped amount between the oil chambers 13 and oil holes 31a formed in main bearings 31 mounted to the bearing saddles 11, the amount of oil supplied to the main journals or the pin journals is adjusted. The overlapped amount is the amount of a portion through which the oil chambers 13 and the oil holes 31a communicate.

The cylinder block 10 has the bearing saddles 11 to which the main bearings 31 for respectively supporting the main journals of crank shaft at both sides of each cylinder are mounted. Since the adjacent cylinders share one bearing saddle 11, the cylinder block 10 typically has the number of bearing saddles which is one more than the number of cylinders.

For example, in a four-cylinder engine, the cylinder block 10 has five bearing saddles.

In this case, it is necessary to supply oil to the bearing saddles 11, and supply the oil to portions at which the main bearings 31 come into contact with the main journals of the crank shaft.

The oil chambers 13, which communicate with the oil galleries 12 and temporarily store the oil, are formed in the bearing saddles 11 and each of which has a different length adjusts the amount of oil supply.

The oil galleries 12 supply oil which is pressed by an oil pump or the like to the bearing saddles 11 and supply the lubricant oil to contact portions between the cylinder block 10 and the crank shaft. The oil galleries 12 may be formed in the cylinder block 10 when the cylinder block 10 is manufactured.

Each oil chamber 13 is connected to an end portion of the associated oil gallery 12, and is recessed along the circumference of the associated bearing saddle 11 from the surface of the bearing saddle 11. The oil supplied from the oil gallery 12 is temporarily stored in the oil chamber 13.

The oil chambers 13 have a different length according to the bearing saddles 11 in which the oil chambers 13 are formed.

For example, the crank shaft is supported by five bearing saddles 11 in the cylinder block 10 in the four-cylinder engine. Therefore, the five bearing saddles 11 are divided into two groups, so that the oil chambers 13 formed in one group have a short length, and the oil chambers 13 formed in the other group have a relatively short length.

Figure 8:
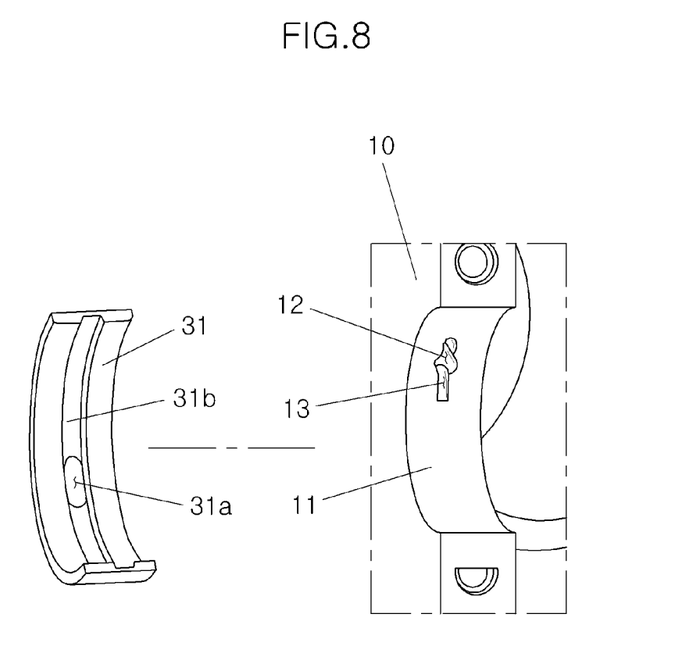
FIG. 8 is an exploded perspective view illustrating a short overlapping portion between an oil chamber of each bearing saddle and an oil groove of each main bearing in a cylinder block having a different amount of oil supply for each journal according to an embodiment of the present inventive concept.
Figure 9:
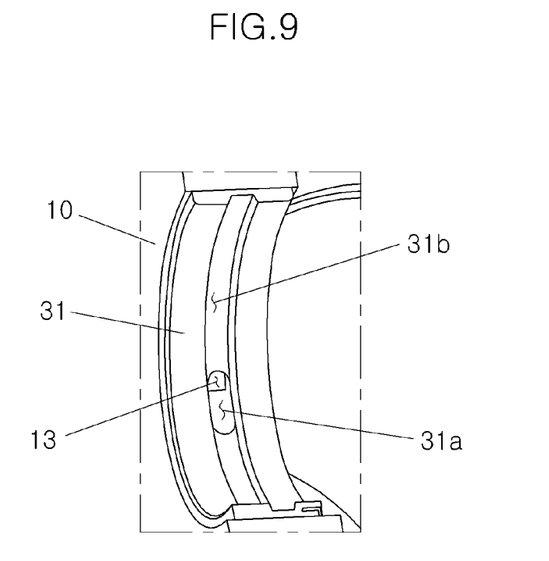
FIG. 9 is a perspective view illustrating the short overlapping portion between the oil chamber of each bearing saddle and the oil groove of each main bearing in the cylinder block having a different amount oil supply for each journal according to the embodiment of the present inventive concept.
Figure 11:
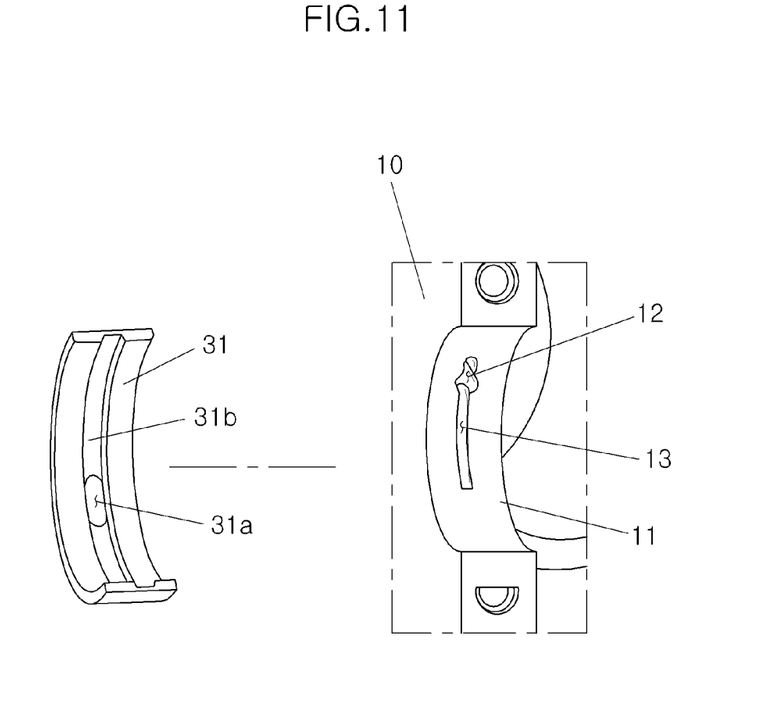
FIG. 11 is an exploded perspective view illustrating a long overlapping portion between an oil chamber of each bearing saddle and an oil groove of each main bearing in the cylinder block having a different amount of oil supply for each journal according to the embodiment of the present inventive concept.
Figure 12:
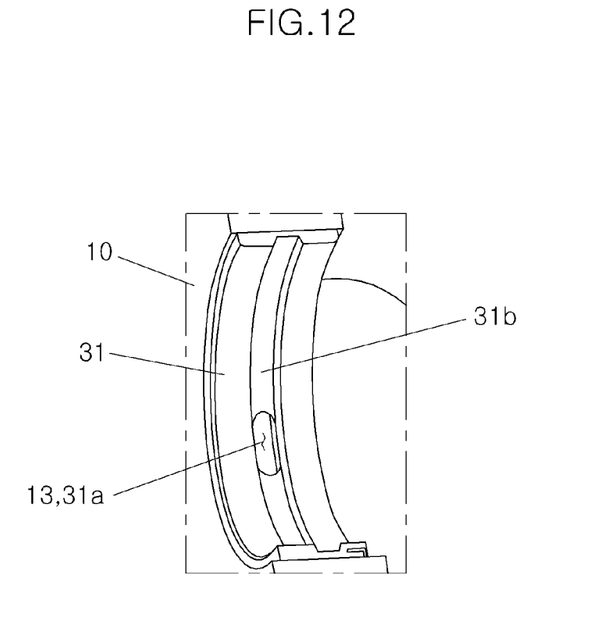
FIG. 12 is a perspective view illustrating the long overlapping portion between the oil chamber of each bearing saddle and the oil groove of each main bearing in the cylinder block having a different amount of oil supply for each journal according to the embodiment of the present inventive concept.

As illustrated in FIGS. 8 and 11, the oil chamber 13 illustrated in FIG. 8 has a longer length than that of the oil chamber 13 illustrated in FIG. 11.

Since the main bearings 31 mounted to the bearing saddles 11 have the same specification, the oil holes 31 having a slot shape are formed at the same position in the main bearings 31 mounted to the respective bearing saddles 11. In addition, each main bearing 31 has a groove 31b formed in the circumferential direction thereof such that the oil passing through an associated oil hole 31a is evenly supplied to the entirety of the main bearing 31.

Figure 10:
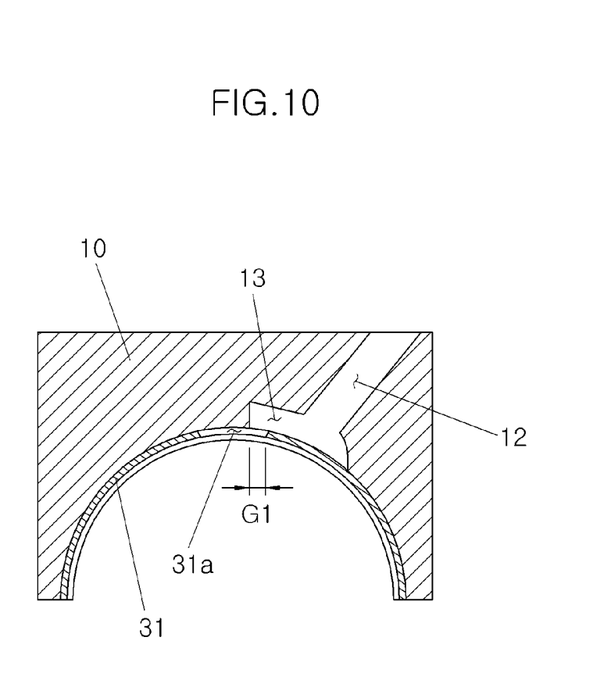
FIG. 10 is a cross-sectional view of FIG. 9.
Figure 13:
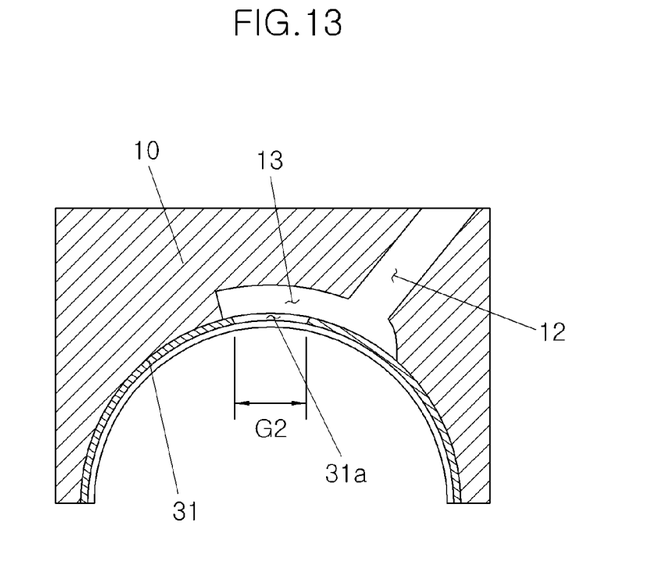
FIG. 13 is a cross-sectional view of FIG. 12.

Accordingly, an overlapping length between the oil chamber 13 and the oil hole 31a in FIG. 10 differs from an overlapping length between the oil chamber 13 and the oil hole 31a in FIG. 13, as indicated by respective reference numerals G1 and G2 in FIGS. 10 and 13, and the amount of oil supply increases as the overlapping length increases. If the bearing saddle 11 requires a relatively large amount of oil, the oil chamber 13 has a longer length, compared to the bearing saddle 11. Thereby, the overlapping portion between the oil chamber 13 and the oil hole 31a of the main bearing 31 increases, and thus, the amount of oil supply of increases. On the other hand, in bearing saddle 11 which requires a relatively less oil, the overlapping portion between the oil chamber 13 and the oil hole 31a of the main bearing 31 is decreased so that the amount of oil supply decreases.

Here, the oil chambers 13 have different lengths and the oil holes 31a of the main bearings 31 are formed at the same position so as to provide a different amount of oil supply. That is, since the cylinder block 10 having the bearing saddles 11 is previously manufactured by casting or the like and the main bearings 31 are then assembled to the respective bearing saddles 11, the error assembly therebetween may be prevented by providing the main bearings 31 with the same specification. If the main bearings have a plurality of specifications, error assembly may occur since an operator assembles the main bearings suitable for the respective bearing saddles. However, when the main bearings have the same specification, error assembly may be previously prevented.

In the bearing saddle 11 formed at the far end of the cylinder block 10, the oil chamber 13 is set to have a relatively short length such that the overlapping region between the oil chamber 13 of the bearing saddle 11 and the oil hole 31a of the main bearing 31 is small. In addition, in the bearing saddle 11 formed inward from a far end of the cylinder block 10, the oil chamber 13 has a long length such that the overlapping region between the oil chamber 13 of the bearing saddle 11 and the oil hole 31a of the main bearing 31 is large. Moreover, this structure may be alternated.

When this structure is applied to the four-cylinder engine, oil chambers 13 of first, third, and fifth bearing saddles 11 have a short length, and oil chambers 13 of second and fourth bearing saddles 11 have a longer length that the oil chambers 13 of the first, third, and fifth bearing saddles 11.

Thus, a leakage of oil in the crank shaft illustrated in FIG. 4 is reduced compared to that in the crank shaft illustrated in FIG. 2. Therefore, the amount of oil supplied to the first, third, and fifth bearing saddles 11 is reduced and the amount of oil supplied to the second and fourth bearing saddles 11 is sufficiently maintained. Consequently, a leakage of oil is reduced and power loss due to the supply of oil is decreased, thus improving fuel efficiency.

According to another embodiment of the present inventive concept, an overlapping length between an oil chamber 13 of each bearing saddle 11 and an oil hole 31a of each main bearing 31 may vary according to the position of the oil chamber 13 formed in the bearing saddle 11.

That is, the oil chamber 13 of the bearing saddle 11 communicating with an oil gallery 12 have a determined length, and the oil chamber 13 may be formed at a different position along the circumference of the bearing saddle 11. Since the oil hole 31a is formed at the fixed position of the main bearing 31, the overlapping length between the oil hole 31a and the oil chamber 13 may vary when the main bearing 31 is mounted to the bearing saddle 11. Thereby, the amount of oil supplied to a main journal may be controlled.

In the present disclosure, when the cylinder block is applied the four-cylinder engine, the oil holes 31a overlaps with the oil chamber 13 such that a large amount of oil is supplied to the second and fourth bearding saddles compared to the first, third, and fifth bearing saddles 11.

In accordance with the cylinder block having a different oil supply for each journal according to the exemplary embodiments of the present inventive concept, oil chambers for temporarily storing oil are set to have a different length according to the overlapped amount between the oil chambers and oil holes of main bearings, so that the amount of oil supplied to main journals of a crank shaft can be controlled even though the main bearings having the same specification are applied.

In addition, since the main bearings having the same specification are installed to bearing saddles of the cylinder block in the state in which the oil chamber have a different length when the cylinder block is cast, error assembly can be prevented when an engine is assembled.

Since oil is sufficiently supplied to a portion of the main journals of the crank shaft and unnecessary supply of oil to the other of the main journals is reduced, an oil leak is decreased and power loss due to the unnecessary supply of oil is reduced, thus improving fuel efficiency.

While the present disclosure has been described with respect to the specific embodiments, it will be apparent to those skilled in the art that various changes and modifications may be made without departing from the spirit and scope of the invention as defined in the following claims.

What is claimed is:

1. A cylinder block applied to a four-cylinder internal combustion engine and having a different amount of
   oil supply for each journal, in which a plurality of bearing saddles are arranged at intervals and
   main bearings, which support main journals of a crank shaft, are respectively mounted to the plurality of bearing saddles,
   wherein the plurality of bearing saddles comprise:
   oil galleries formed in the cylinder block; and
   oil chambers recessed from surfaces of the plurality of bearing saddles, to which an oil is supplied through the oil galleries, and communicating with end portions of the oil galleries to store the oil supplied from the oil galleries,
   wherein the main bearings have oil holes through which the oil introduced into the oil chambers flow to the main journals,
   an amount of the oil flowed and supplied to the main journals increases in proportion to the overlapped amount between the oil chambers and the oil holes in alternating manner for the respective different main bearings across the crankshaft starting from one side of the cylinder block, and the oil holes formed in the main bearings have the same position, and the oil chambers differently overlap with the oil holes according to lengths of the oil chambers in the plurality of bearing saddles, and the oil chambers formed in second and fourth bearing saddles from the one side of the cylinder block have longer lengths than the oil chambers formed in first, third, and fifth bearing saddles.

2. The cylinder block of claim 1, wherein the oil holes formed in the main bearings have the same position, and the oil chambers differently overlap with the oil holes according to positions of the oil chambers formed in the plurality of bearing saddles.

3. The cylinder block of claim 1, wherein the main bearings, which are assembled to the respective bearing saddles, have the same shape.

4. The cylinder block of claim 1, wherein each of the oil holes formed in the main bearings has a slot shape in a circumferential direction of the main bearings.

5. The cylinder block of claim 1, wherein each of the main bearings has a groove formed in a circumferential direction of the main bearings such that the oil, which passes through the oil holes, is evenly supplied to the main bearings.

* * * * *